Patented June 5, 1923.

1,457,675

UNITED STATES PATENT OFFICE.

WALTER SCHOELLER, OF FREIBURG, BREISGAU, GERMANY.

PHARMACEUTICAL PRODUCT.

No Drawing.  Application filed August 24, 1922. Serial No. 584,135.

*To all whom it may concern:*

Be it known that I, WALTER SCHOELLER, a citizen of Germany, residing at Freiburg, in Breisgau, Ludwigstrasse 32, Germany, have invented new and useful Improvements in Pharmaceutical Products (for which I have made application in Germany, May 14, 1921), of which the following is a specification.

My invention relates to the hitherto unknown mercury derivatives of diallyl substituted fatty carboxylic acid compounds having most probably the general formula:

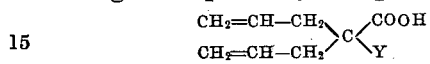

(Y includes hydrogen and the carboxylic group) and their derivatives.

For producing my new compounds the above mentioned diallyl substituted fatty carboxylic acid compounds, e. g. diallylmalonic ester, diallylmalonyl urea, diallyl acetic ester, etc., are treated with mercury salts. If esters are used as starting materials the mercury compounds are converted into the free mercury fatty acids by saponification to obtain the free acids.

With the entrance of mercury into the molecule of the above mentioned compounds between two carbon atoms of two molecules of the starting material an oxygen-bridge is formed. Hydroxyl or alkoxy groups entering at the same time into the other allyl radicle of two molecules of the diallyl compound. Products are thus obtained which have in a free state most probably the following formula:

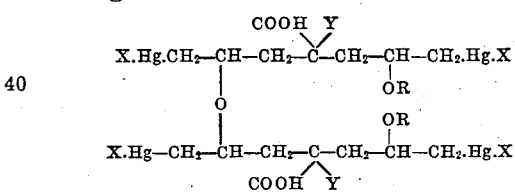

X standing for a radicle of an acid, such as Cl—, SO$_4$=, CH$_3$—COO— etc., Y includes hydrogen and a carboxylic group, R includes hydrogen and an alkyl e. g. —CH$_3$; —C$_2$H$_5$ etc. According to the conditions used during the reaction, e. g. the strength of alcohol used as a diluent, etc., other products are formed besides the above mentioned containing no more the two radicles —OR but a second oxygen-bridge between two other carbons. These products have in a free state most probably the following general formula:

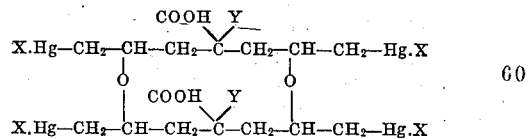

X and Y having the above meaning.

Practically mixtures of the two series of compounds are obtained.

The new compounds are generally whitish products which in the shape of their esters are almost insoluble in water, ether and ligroin, they can be crystallized from chloroform acetic ester or glacial acetic acid. The free acids are very difficultly soluble in the usual solvents. They crystallize from hot anilin.

My new products have proved to be valuable anti-syphilitics characterized by a mild action and the fact that they are non-irritant and not corrosive renders them highly valuable especially for subcutaneous injections. They form soluble salts with alkali metals or double salts with alkali salts of amino acids, e. g. with the sodium salt of diethylbarbituric acid. These salts retain the valuable therapeutic properties of the free acids.

In order to illustrate my invention more fully the following example is given, the parts being by weight:—

600 parts of powdered mercury sulfate are suspended in 750 parts of water the equal volume of 96 per cent of ethyl alcohol is added and the resulting mixture is heated to boiling. Into the boiling mixture a solution of 250 parts of diallylmalonic acid ethyl ester in 250 parts of a 96 per cent ethyl alcohol is added. Boiling is continued until a test portion is clearly soluble in a dilute caustic soda lye. The precipitate is filtered off from the cold mixture and washed with alcohol and acetic acid ester. For saponification 1 part of the ester is heated with 1 part of a twenty per cent caustic soda lye. The liquid is filtered and from the filtered solution the new mercury compound is isolated by acidulation with sulfuric acid, filtered off and dried. It crystallizes from hot anilin in plates which are almost insoluble in the usual organic solvents. The alkalin salts or double salts are soluble in water.

Instead of diallylmalonic acid ester other of the above mentioned diallyl compounds can be used, e. g. diallyl acetic ester, diallylbarbituric acid, etc., or other mercury compounds may be employed, e. g. acetate of mercury, mercuric chlorid, etc.

I claim:—

1. As new products the new mercury compounds derivable from diallyl substituted fatty carboxylic acid compounds, which new compounds are after being dried and pulverized generally whitish powders which in the shape of their esters are almost insoluble in water, ether and ligroin, crystallizing from chloroform; being in the shape of the free acids difficultly soluble in the usual organic solvents; being valuable therapeutics and forming soluble salts with alkali metals and double salts with alkali salts of amino acids, which salts retain the valuable therapetuic properties of the free acids, substantially as described.

2. As a new product the new mercury compounds derivable from diallylmalonic acid and mercury sulfate, which new product crystallizes in the shape of the free carboxylic acid from hot anilin in glistening plates almost insoluble in the usual organic solvents; being a valuable therapeutic; forming soluble salts with alkali metals and double salts with alkali salts of amino acids, which salts retain the valuable therapeutic properties of the free acid, substantially as described.

In testimony whereof I have hereunto set my hand.

WALTER SCHOELLER. [L. S.]